United States Patent [19]
Hennart

[11] 3,832,464
[45] Aug. 27, 1974

[54] PESTICIDAL COMPOSITIONS CONTAINING PHOSPHORIC ACID ESTERS AND ELEMENTAL SULPHUR

[75] Inventor: Claude Hennart, Aubervilliers, France

[73] Assignee: Ciba-Geigy AG, Basel, Switzerland

[22] Filed: Sept. 13, 1971

[21] Appl. No.: 180,135

[30] Foreign Application Priority Data
Sept. 11, 1970 France .............................. 70.33012

[52] U.S. Cl................. 424/175, 424/164, 424/219
[51] Int. Cl. ........................ A01n 11/06, A01n 9/36
[58] Field of Search.................... 424/164, 175, 219

[56] References Cited
UNITED STATES PATENTS
3,093,536  6/1963  Loeffler .............................. 424/219
3,097,128  7/1963  Sprinkle et al...................... 424/219
3,116,201  12/1963  Whetstone .......................... 424/219

OTHER PUBLICATIONS
Grov et al. Chem. Abstracts 53: 11743 c (1959)
Hough et al. Chem. Abstracts 56: 10635 (b) (1962)

Primary Examiner—Shep K. Rose
Attorney, Agent, or Firm—Wendertoh, Lind & Ponack

[57] ABSTRACT

Pesticidal composition comprising stabilised pesticidal phosphoric esters containing as stabilising agent for said esters 0.05 to 6 percent of a compound chosen between the know varieties of elemental sulphur.

Process to stabilise pesticidal phosphoric esters according to which 0.05 to 6 percent of a compound chosen among the known varieties of elemental sulphur is added to the composition containing the phosphoric ester.

5 Claims, No Drawings ial phosphoric esters, and new stabilised composi-
PESTICIDAL COMPOSITIONS CONTAINING PHOSPHORIC ACID ESTERS AND ELEMENTAL SULPHUR This invention relates to a process for stabilising pesticidal phosphoric esters, and new stabilised compositions containing such esters.

Phosphoric esters are now widely used as pesticides, particularly as insecticides. Their wide use is due principally to their rapid action and the absence of any accumulation of the compounds in living tissue as a result of their rapid hydrolysis in situ.

This last characteristic, which gives a net advantage over "chlorinated" pesticides, is on the other hand, a serious disadvantage: the sensitivity of certain phosphoric acid esters to humidity, even just that of the atmosphere, is such that decomposition takes place before they are able to act on the pest organisms. The esters particularly susceptible to this are those containing low alkyl groups such as methyl, ethyl, propyl or isopropyl attached to the phosphoric anion. On contact with molecules of water, at least partial decomposition of the esters takes place by protonisation, i.e., by replacement of a low alkyl group by hydrogen.

Amoung the sensitive phosphoric esters, special mention should be made of 0-2,2-dichlorovinyl-0,0-dimethyl phosphate, better known by the common name of DICHLORVOS or DDVP, the use of which in permanent insecticidal devices, so-called evaporators, has risen very greatly during recent years.

Various methods of stabilisation have already been suggested to limit the decomposition of there phosphoric esters, but they are generally toxic such as phenols, amines or light nitrogenous heterocycles; another class of useful stabilisers includes azoic and hydrazonic compounds, but these possess a strong colouring ability which does not always permit them to be used. The use of anhydrides or epoxides has also been suggested, but it is known that these compounds act by fixation either of a molecule of water or of a molecule of free acid: it is clear that this process is stoichiometrically limited and that stabilisation ceases when all the stabiliser has reacted. This leads to the necessity of using substantial proportions of these stabilisers, which is not economic.

It is an object of the present invention to stabilise pesticidal phosphoric esters by using substances more efficacious and not having the disadvantages stated above.

It has been said that insecticidal phosphoric esters are unstable on solid supports, notably sulphur (French Pat. specification Nos. 1,323,110 and 1,332,542). However, it has now been found, this being particularly unnoticed before, that elemental sulphur, on the contrary, is of particular value when used to preserve phosphoric esters against protonisation when it is used in very weak proportions.

The present invention thus provides a process for stabilising a pesticidal phosphoric ester the molecule of which contains at least one alkyl group of 1 to 3 carbon atoms, optionally in admixture with a solvent for the phosphoric ester, which solvent is a solid or liquid at ambient temperature, under pressure or not, and/or optionally in admixture with one or more adjuvants compatible with the phosphoric ester, which process comprises adding to the phosphoric ester or to a mixture containing it, 0.05 to 6 percent calculated on the weight of phosphoric ester, of an agent capable of stabilising the phosphoric ester against protonisation, and being chosen from the known varieties of elemental sulphur. According to a preferred embodiment, the proportion of stabiliser is between 0.05 and 4 percent calculated on the weight of phosphoric ester.

The invention also provides pesticidal compositions comprising:

A. at least one pesticidal phosphoric ester, the molecule of which has at least one alkyl group containing 1 to 3 carbon atoms, and B. an agent stabilising the said ester against decomposition by protonisation, characterised in that it is chosen from among the known varieties of elemental sulphur, and is used in a proportion of 0.05 to 6 percent, preferably 0.2 to 4 percent, calculated on the weight of phosphoric ester.

Such a composition may contain optionally a solvent for the phosphoric ester, solid or liquid, under pressure or otherwise. It may also optionally contain one or more inert mineral or organic adjuvants.

The varieties of elemental sulphur which can be used in the invention are those corresponding to various known physical forms and molecular structures. Such forms and structures are, for example, the following:
  alpha sulphur, rhombic crystals
  beta sulphur, monoclinic crystals
  lambda sulphur in octaatomic rings
  mu sulphur polymerised in long chains
  pi sulphur in octaatomic chains
  rho sulphur, hexaatomic.

The solvents for the phosphoric ester may advantageously be aliphatic alicyclic or aromatic hydrocarbons, which are solid or liquid at ambient temperature with or without pressure. Such solvents may be used separately or in admixture. Their solvent action for the phosphoric ester and/or the diazene can be optionally reinforced by the addition of co-solvents which may be selected from aliphatic ketones, hydroxylated compounds, ethers, esters, amides, nitriles and halogenated hydrocarbons.

Other solvents usable in compositions according to the present invention are halogenated hydrocarbons containing at most 12 carbon atoms, ethers and esters formed between aliphatic, cycloaliphatic or aralkoylic alcohols or phenols, and aliphatic acids or di-acids such as phthalic acid, sebacic acid or adipic acid, or even non-pesticidal phosphoric esters such as the phosphoric triesters of methyl, ethyl, butyl, octyl, decyl, dodecyl, phenyl, cresyl, diphenyl, tert. butylphenyl etc. solvents usable in the compositions according to the present invention may also be solid compounds, for example synthetic organic resins such as homopolymers and copolymers of vinyl derivatives (acetate, propionate, butyrate, oxides, formal, acetal, butyral, chloride etc.) and/or vinylidene or alkene derivatives (ethylene, propylene, butylene etc.) and/or styrene, and/or vinyl pyrrolidones and/or cellulose derivatives (methyl oxide, ethyl oxide, benzyl oxide, acetate, propionate, butyrate, phthalate, nitrate, etc.) and/or isoprene and/or butadiene and/or acrylic or methacrylic esters and/or allyl esters (phthalate, isophthalate, maleate, cyanurate, etc) and also synthetic resins of the type arising from the interaction of compounds with reactive groups, as is the case with the so called "epoxy" resins, formed by the condensation of an epoxide with a polyphenol, polyester resins formed by the action of a polyacid with a polyol, polyurethane resins formed by condensation of a polyisocyanate with a polyol, or coumarone-indene type resins.

Solid compounds serving as solvents may also be natural resins, for example colophony, shellac, tallol or a waxy resin. Amongst inert mineral adjuvants which may be introduced into compositions according to the present invention, the following should be noted: brick, pumice, vermiculite, kaolin, dried clay, calcium carbonate, pyrophyllite, dolomite, glass fibre, plaster, talc, natural silica, fossil or otherwise, synthetic silica and metallic oxides. Among inert organic adjuvants which may be introduced into the compositions according to the present invention there should be noted: wood flour, cellulose fibre, starch, maize, faecula, sugars and/or diluents with little solvent action such as paraffin, these being optionally modified in their properties by the addition of synthetic organic resins and/or salts formed by alkoylamino-alkoylamines and aliphatic acids, and/or amine derivatives of montmorillonite such as bentones.

The complementary stabilisers are advantageously selected from oxiranes, epoxidised oils such as epoxidised soya oil, alkyl epoxystearate and epoxyhaloalkenes or from azoic compounds or their metalliferous derivatives.

Compositions according to the present invention can also contain one or more natural or synthetic aromatic materials, complementary active agents such as an acaricide, an insectifugal agent, a bird-repellant, an antifugal agent, a vegetable growth-regulating agent, a herbicide or a bactericide. Thus formulated, the composition of the present invention may be solid or liquid. It can be disposed on a solid porous or fibrous support. This support may be formed, for example, by a paper, a felt of wool, cotton and/or synthetic fibre, compressed cellulose such as wood fibre, cereals, alfa or cotton, a felt card, a card of old papers or a card of glass fibre.

Such a composition is preferably used as an insecticidal agent. The presence of elemental sulphur as stabiliser confers on the phosphoric ester an enhanced resistance to the destructive effect of water contained in the composition used and in the ambient humidity, as is shown by the following exemplary experiments.

EXPERIMENT A 5 cm by 10 cm squares cut from a cellulose card made by the French company PIORONI S.A. under their reference 200 were used. At the time of use, the card weighed 875 g/m$^2$.

The card sheets were united in pairs, back to back, by means of staples. These doubled cards were divided into two series numbered I-A and I-B.

The doubled cards I-A were each impregnated with 12.5 g of DDVP (the current common name for O(2,2-dichlorovinyl) 0,0-dimethyl phosphate), and the other doubled cards were each impregnated with 12.5 g of a 0.2 by weight solution of sulphur in DDVP.

The doubled cards were suspended in a room of which the temperature was maintained at 22° ± 2°C, and the relative humidity of which was about 42.

At the end of 8 days the quantity of DDVP destroyed by hydrolysis was measured potentiometrically (it has been established elsewhere that hydrolysis of DDVP in the conditions given above leads to an acid phosphoric ester and that the potentiometric measurement of the single acidity or of the first acidity of this ester allows the quantity of DDVP hydrolysed to be measured).

Account was taken of the acidity present in the DDVP (1 percent equivalent DDVP) and this was deducted from the results obtained.

The percentage quantities of DDVP decomposed by hydrolysis which were formed are compiled in the table below. In the table, the values qualified by ± represent the spread of results in each test.

| I-A | I-B |
|---|---|
| 24.1 | 0.2 |
| ±2.3 | ±0.02 |

The results of this experiment show to what extent DDVP is sensitive to himidity when unprotected. They also show how the hydrolysis may be reduced to a substantial degree when sulphur is added to this phosphoric ester.

EXPERIMENT II

Three compositions were prepared II-A, II-B and II-C as follows (percentages by weight)

|  | II-A | II-B | II-C |
|---|---|---|---|
| DDVP % | 4.75 | 4.75 | 4.75 |
| water % | 0.19 | 0.19 | 0.19 |
| kaolin % (d'') | 95.06 | 90.31 | — |
| powdered sulphur % (d'') | — | 4.75 | 95.06 |

(d'')The dampness in the kaolin was 0.55 % by weight, that of the sulphur 0.10 % (measurements by infrared humidimeter.)

The so prepared powders were each enclosed in a sealed flask and placed in a cupboard at ambient temperature (20° ± 2°C).

At the end of a month, the DDVP contained in each powder was measured by gas phase chromatography (Aerograph apparatus, type 90–P–4; 5 foot column diameter 1¼ inch of silicone XE.60 on Sil-O-Cel C–22 of 250/500 temperature 190°C, detection by catharometry); the DDVP was extracted from the powder by methylene chloride.

The proportion in % of the DDVP which had diappeared in each powder is shown in the following table:

| II-A | II-B | II-C |
|---|---|---|
| 27 | 9 | 22 |

The results of this experiment show that sulphur possesses the stabilising properties toward phosphoric esters when added thereto in small proportion as suggested by the invention, and that this is not the case when it is used in preponderant amount as the support for the phosphoric ester.

EXPERIMENT III

Doubled cards were used as described in Experiment I. These doubled cards were divided into 8 series III-A to III-H. The cards III-A were each impregnated with 12.5 g of DDVP, the other cards were each impregnated with 12.5 g of a solution in DDVP as follows:

III-B    0.2 percent sulphur

III-C 1.2 percent 4-phenylazo-3-methyl-1-phenyl-5-hydroxy pyrazole

III-D 0.2 percent sulphur + 1.2 percent 4-phenylazo-3-methyl-1-phenyl-5-hydroxypyrazole III-E 1.2 percent 4-dimethylamino azo benzene III-F 0.2 percent sulphur + 1 percent 4-diethylamino azo benzene III-G 0.7 percent 1-phenylazo-2-naphthol III-H 0.2 percent sulphur + 0.5 percent 1-phenylazo-2-naphthol.

After impregnation the doubled cards were each placed in a sachet formed of a mesh of "nylon 66" of filaments 0.14 mm and meshes of 0.3 mm made by the French company Tripette et Renaud.

The thus impregnated cards were suspended in a room the temperature of which was kept at 22° ± 2°C and of which the relative humidity was about 35. At the end of 15 days, the percentage quantity of DDVP destroyed were measured as in Experiment I and tabulated as follows:

| A | B | C | D | E | F | G | H |
|---|---|---|---|---|---|---|---|
| 35.6 | 1.9 | 3.3 | 0.3 | 1.3 | 0 | 1.3 | 0.3 |
| ±0.8 | ±0.3 | ±0.8 | ±0.002 | ±0.1 | — | ±0.1 | ±0.02 |

The results of this experiment show the value of mixtures of stabilisers according to the invention with stabilisers belonging to the family of azoic compounds. There can be seen, in effect, in all these results, a synergistic effect with the two types of stabiliser.

EXPERIMENT IV

Doubled cards were used as in Experiment I but of size 7 × 10 cm. These cards were divided into two series IV-A and IV-B. The doubled cards IV-A were each impregnated with 16.6 g of a composition containing 50 percent by weight DDVP and 50 percent by weight of a mixture containing 3 parts by weight vaseline oil and one part by weight stearone.

The doubled cards IV-B were each impregnated with 16.6 g of the same composition as before but in which 21 percent by weight of the vaseline oil + stearone mixture relative to the weight of the composition, had been replaced by 2 percent by weight elemental sulphur and 0.1% 1-(4-methyl-2-nitrophenylazo)-3-ethoxycarbonyl-4,4-dimethyl-2,6-dioxo cyclohexane.

The so impregnated doubled cards were each placed in a sachet made of a polyethylene/aluminium complex, the polyethylene side being inside, and the sachets were sealed hermetically by welding.

After storage for 8 months at a temperature of 40°C the sachets were opened and their contents analysed as described in Experiment I. The following percentage quantities of DDVP decomposed were found

| IV-A | IV-B |
|---|---|
| 16.7 | 5.8 |

EXPERIMENT V

Four series of compositions were prepared containing 50 percent by weight DDVP. These series were called V-A and V-B. The compositions V-A contained 50 percent by weight xylene; the compositions V-B contained 1 percent elemental sulphur and 49 percent xylene.

These compositions were each enclosed in a sealed flask put at a temperature of 60°C. After 36 days, the flasks were opened and their contents analysed as described in Example I. The following percentage quantities of DDVP destroyed were found:

| V-A | V-B |
|---|---|
| 14.7 | 2.6 |

The results of Experiments IV and V show the value of the stabilisers of the invention in protecting phosphoric esters and products containing them during storage.

EXPERIMENT VI

Doubled cards were used as in Experiment I, but of weight 900 g/m$^2$. These cards were divided into four series called VI-A to VI-D.

The doubled cards were each impregnated with 12.5 g of a solution in DDVP of the following compounds:

VI-A 0.2 percent elemental sulphur
VI-B 0.1 percent elemental sulphur + 0.1 percent phenol
VI-D 1.2% phenol.

The thus impregnated cards were suspended in a room the temperature of which was kept at 22° + 2°C and of which the relative humidity was about 70.

At the end of 25 days, the percentage quantities of DDVP destroyed were measured as noted in Experiment I and tabulated as follows:

| VI-A | VI-B | VI-C | VI-D |
|---|---|---|---|
| 2.8 | 9.6 | 41.1 | 18.6 |

The results of this experiment show that elemental sulphur is a stabiliser for DDVP far superior to phenol. They show also that there is no value in associating the two stabilisers.

Several formulations are described below with the object of illustrating the invention, though not of limiting it.

The azoic compounds used as complementary stabilisers are denoted as follows, with the exception of azobenzene which is referred to as such:

diazene A: 1-(4-phenylazo phenylazo) 2-ethylamino naphthalene diazene B: 1-(4-methyl-2-nitro phenylazo)-3-ethoxycarbonyl-4,4-dimethyl-2,6-dioxo cyclohexane diazene C: 1-phenylazo-2-naphthol diazene D: 1-phenylazo N,N-diethylaniline diazene E: chromium complex (1 : 2), in admixture of the following azoic compounds:
  1-(2-hydroxy-5-nitro phenylazo)-2-naphthol, sodium salt (0.4 mole)
  1-(2-hydroxy-4-nitro phenylazo)-2-naphthol, sodium salt (0.3 mole)

Diazene F: chromium complex (1:2) in admixture, of diazo compounds (2-amino-5-nitro-4-ethylsuphonyl-phenol) → 2-(2-carboxy-phenyl)naphthylamine, (2-amino-5-nitro-4-ethylsulphonylphenol) → 8-hydroxyquinoline, sodium salt.

In the tables in the following examples, values are expressed in parts by weight throughout.

EXAMPLES 1 to 7

Insecticidal compositions comprising DDVP as phosphoric ester, and elemental sulphur as principal stabiliser therefore, the compositions sometimes also containing a solvent for the ester and/or a complementary stabiliser chosen from azoic compounds and epoxidised compounds.

Table I

| DDVP | 1 | 2 | 3 | 4 | 5 | 6 | 7 |
|---|---|---|---|---|---|---|---|
|  | 99.8 | 99.3 | 75 | 70 | 79 | 85 | 90 |
| Dioctyl phthalate | — | — | 20 | 25 | — | — | — |
| Dibutyl sebacate | — | — | — | — | 20.2 | — | 9.2 |
| Diisooctyl adipate | — | — | — | — | — | 14 | — |
| Azobenzene | — | 0.5 | — | — | — | — | 0.2 |
| Diazene D | — | — | — | — | 0.5 | — | — |
| Diazene E | — | — | — | 0.4 | — | — | 0.4 |
| Epoxidised soya oil | — | — | 4.5 | — | — | — | — |
| Octyl epoxystearate | — | — | — | 4.2 | — | — | — |
| Sulphur | 0.2 | 0.2 | 0.5 | 0.4 | 0.3 | 1 | 0.2 |

EXAMPLES 8 to 15

Insecticidal compositions comprising DDVP as phosphoric ester, elemental sulphur as principal stabiliser therefor, a vaseline or paraffin oil as solvent, a heavy alkanone as co-solvent, and in some cases a complementary stabiliser chosen from azoic compounds and epoxidised compounds.

Table II

| DDVP | | 8 | 9 | 10 | 11 | 12 | 13 | 14 | 15 |
|---|---|---|---|---|---|---|---|---|---|
|  | | 50 | 60 | 75 | 25 | 40 | 40 | 50 | 50 |
| Vaseline oil | (f) | — | — | — | — | 48 | 48 | — | 36.5 |
| Paraffin oil | (g) | 36.7 | 30 | 17 | 60 | — | — | 37 | — |
| Laurone | | — | 9.9 | 6 | 12.5 | — | — | — | — |
| Palmitone | | — | — | — | — | 10 | 10 | — | — |
| Stearone | | 12.2 | — | — | — | — | — | 12.4 | 12.5 |
| Cyclohexyl epoxystearate | | — | — | — | — | 1 | — | — | — |
| Epoxidised soya oil | | — | — | — | — | — | 1.8 | — | — |
| Diazene B | | 0.1 | — | — | — | — | — | — | — |
| Diazene C | | — | — | — | — | — | — | — | 0.1 |
| Diazene D | | — | — | — | — | — | — | 0.2 | — |
| Sulphur | | 1 | 0.1 | 2 | 2.5 | 1 | 0.2 | 0.4 | 0.9 |

(f) semi-refined oil having a density of 0.867 at 15°C and a freezing point of about −42°C.
(g) semi-refined product having a density of 0.870 at 15°C and a viscosity of 1.7° Engler at 50°C.

EXAMPLES 16 to 21

Insecticidal compositions comprising DDVP as phosphoric ester, elemental sulphur as principal stabiliser for this ester, a solid or semi-solid adjuvant chosen from paraffin and vaseline, a solvent chosen from heavy alkanones and in some cases a complementary stabiliser chosen from azoic compounds and epoxidised compounds.

Table III

| DDVP | 16 | 17 | 18 | 19 | 20 | 21 |
|---|---|---|---|---|---|---|
|  | 15 | 18 | 33 | 27 | 32 | 20 |
| Ordinary paraffin 60/62° | — | 57 | — | — | — | 55 |
| Ordinary paraffin 52/54° | 65 | — | — | — | — | — |
| Vaseline (j) | — | — | 32 | 35 | 30 | — |
| Laurone | 19 | 23 | — | — | — | 24 |
| Stearone | — | — | 33 | 37 | 32 | — |
| Epichlorhydrin | — | — | 1 | — | 2.5 | — |
| Diazene D | — | 0.2 | — | — | — | 0.5 |
| Azobenzene | — | — | — | — | 0.5 | — |
| Sulphur | 1 | 1.8 | 1 | 1 | 3 | 0.5 |

(j) yellow-colored petroleum jelly technical product having a dropping point above 47°C. Vaseline is a trademark of Cheeseborough-Pond.

EXAMPLES 22 to 28

Insecticidal compositions usable in wick evaporators formed by a reservoir and a wick dipping into the composition and having a part open to the atmosphere. These compositions comprise DDVP as phosphoric ester, a solvent for the ester chosen from alkanones, a co-solvent chosen from chlorodecane, 3,6,9-trioxaundecane and 5,8,11-trioxapentadecane, elemental sulphur as principal stabiliser for the phosphoric ester and in some cases a complementary stabiliser chosen from azoic compounds and epoxidised compounds.

Table IV

| DDVP | 22 / 9.2 | 23 / 8.5 | 24 / 9.2 | 25 / 9.2 | 26 / 9.6 | 27 / 9.7 | 28 / 7.8 |
|---|---|---|---|---|---|---|---|
| n-dodecane | — | — | — | — | — | 85.2 | 85.9 |
| "Isopar L" (k″) | 84 | 87.4 | 86.7 | 86.6 | 84.1 | — | — |
| 1-chlorodecane | — | 4 | — | — | — | — | 6 |
| 3,6,9-trioxa undecane (k) | 5 | — | — | — | 5 | — | — |
| 5,8,11-trioxa pentadecane (k′) | — | — | 4 | 4 | — | 5 | — |
| Epoxidised soya oil | 1.7 | — | — | — | — | — | 0.15 |
| Diazene A | 0.04 | — | — | — | 0.06 | — | — |
| Azobenzene | — | — | — | — | 0.14 | — | 0.1 |
| Sulphur | 0.06 | 0.1 | 0.1 | 0.2 | 0.1 | 0.1 | 0.05 |

(k) reinforcing solvent known as diglycoldiethyl ether, and sold under the Trade Mark "diethylcarbitol" by the U.S. Company Union Carbide Chemicals Co. of New York.

(k′) reinforcing solvent known as diglycol dibutyl ether, sold under the Trade Mark "dibutylcarbitol" by the Union Carbide Chemical Co. aforementioned.

(k″) distillation cut between 189° and 205° of branched aliphatic hydrocarbons obtained by synthesis, containing a mixture of decane, undecane and dodecane, sold by the company Esso Standard.

EXAMPLES 29 to 34

Insecticidal compositions comprising DDVP as phosphoric ester, elemental sulphur as principal stabiliser therefor, an odorant material chosen from linalol, ionone, menthone, linalyl acetate, orange terpenes and citron terpenes and in some cases a complementary stabiliser chosen from azoic compounds and epoxidised compounds.

EXAMPLES 35 to 41

Insecticidal compositions comprising DDVP as phosphoric ester, elemental sulphur as principal stabiliser, a synthetic thermoplastic resin as solid solvent, a heavy ester used as complementary solvent acting at the same time, in some cases, as a plasticiser for the resin, and in several cases a complementary stabiliser chosen from azoic compounds and epoxidised compounds.

Table V

| DDVP | 29 / 79.3 | 30 / 79.3 | 31 / 79.5 | 32 / 83 | 33 / 86 | 34 / 85 |
|---|---|---|---|---|---|---|
| Linabl | 7.5 | — | — | — | — | — |
| Alpha ionone | — | — | 20 | — | — | — |
| Menthone | — | — | — | 16 | — | — |
| Linalyl acetate | 7.5 | — | — | — | — | 14.3 |
| Orange terpenes | — | 20 | — | — | — | — |
| Citron terpenes | — | — | — | — | 13 | — |
| Epoxidised soya oil | 5 | — | — | — | — | — |
| Diazene A | 0.5 | 0.2 | — | — | — | — |
| Diazene B | — | 0.4 | — | — | — | 0.5 |
| Sulphur | 0.2 | 0.1 | 0.5 | 1 | 1 | 0.2 |

Table VI

| DDVP | 35 / 20 | 36 / 25 | 37 / 20 | 38 / 25 | 39 / 25 | 40 / 30 | 41 / 20.5 |
|---|---|---|---|---|---|---|---|
| Polyvinyl chloride | 55 | 62 | 62 | 50 | — | — | 60 |
| Ethylene/vinyl acetate copolymer (m) | — | — | — | — | 54 | — | — |
| Vinyl acetate/vinyl chloride copolymer (10 : 90) | — | — | — | — | — | 50 | — |
| Diisooctyl adipate | 23 | — | — | — | — | — | 9 |
| Tricresyl phosphate | — | 10 | 12 | — | — | 19 | — |
| Methyl laurate | — | — | 5.3 | — | — | — | — |
| Dioctyl phthalate | — | — | — | 8 | 10 | — | — |
| Dimethyl succinate | — | — | — | 15 | — | — | 9 |
| Dimethyl maleate | — | — | — | — | 10 | — | — |
| Octyl epoxystearate | — | 2 | — | — | — | — | — |
| Epichlorhydrin | — | — | — | — | — | — | 0.7 |
| Diazene C | 1.9 | — | — | — | — | 0.8 | — |
| Diazene D | — | — | — | — | — | — | 0.5 |
| Coloured pigment | — | 0.6 | — | — | 0.6 | — | — |
| Sulphur | 0.1 | 0.4 | 0.7 | 2 | 0.4 | 0.2 | 0.3 |

(m) copolymer of 67 % ethylene and 33 % vinyl acetate having an intrinsic viscosity of 0.78 for 0.25 g in 100 ml toluene at 30°C.

EXAMPLES 42 to 48

Insecticidal compositions comprising DDVP as phosphoric ester, elemental sulphur as principal stabiliser therefor, a paraffin as solid adjuvant, a fossil silica as mineral adjuvant, and, in some cases, a complementary stabiliser chosen from azoic compounds and epoxidised compounds, an ethylene/vinyl acetate copolymer as an agent improving the mechanical properties of the paraffin, a pigment and/or a modified montmorillonite as dispersant allowing the composition to remain homogeneous before cooling.

Table VII

| DDVP | 42/23 | 43/25 | 44/25 | 45/24 | 46/24.5 | 47/24.5 | 48/24.5 |
|---|---|---|---|---|---|---|---|
| Paraffin 60/62° | 60 | 57 | 46 | 54 | 58 | 65.5 | 65.5 |
| Ethylene/vinyl acetate copolymer (71/29) | — | — | 12 | — | — | — | — |
| Diatomaceous earth | 15 | 16 | 15 | 15 | 15 | — | — |
| Amine oleate (n') | — | — | — | 5 | — | — | — |
| Modified Montmorillonite (n") | — | — | — | — | 1 | 9.0 | 9.0 |
| Pigment (n) | — | — | 0.8 | 0.5 | — | 0.5 | — |
| Epoxidised soya oil | — | 0.5 | — | — | — | — | — |
| Cyclohexyl epoxystearate | — | — | — | — | 1.2 | — | — |
| Azobenzene | — | 0.5 | — | 0.8 | — | — | — |
| Diazene B | — | — | 0.6 | — | — | — | 0.8 |
| Sulphur | 2 | 1 | 0.6 | 0.7 | 0.3 | 0.5 | 0.2 |

(n) yellow Irgalith BAW
(n') product formed by reaction, in a molecular ratio of 2:1 between oleic acid and a mixture of the following diamines:
hexadecylaminopropylene amine (10%)
octadecylamino propylene amine (50%)
octadecylamine propylene amine (85%)
(n") mixture of dimethyl dihexadecylammonium montmorillonite (70%) and dimethyl dioctadecylammonium montmorillonite.

It is clear that the invention is not limited to the formulations just set forth, which are merely given as examples of the manifold possibilities of use of the invention. In particular, the DDVP of these formulations can be replaced by a phosphoric ester chosen from:
1. 2,2-dichloro vinyl dimethyl phosphate
2. 2,2-dichloro vinyl diethyl phosphate
3. 2,2-dichloro vinyl dipropyl phosphate
4. 2,2-dichloro vinyl dibutyl phosphate
5. 2,2-dibromo vinyl dimethyl phosphate
6. 2,2-dibromo vinyl diethyl phosphate
7. 2,2-dibromo vinyl dipropyl phosphate
8. 2-bromo-2-chloro vinyl dimethyl phosphate
9. 2-bromo-2-chloro vinyl diethyl phosphate
10. 2,2-dichloro vinyl, ethyl methyl phosphate
11. 1,2-dibromo-2,2-dichloro ethyl dimethyl phosphate
12. 1,2-dibromo-2,2-dichloro ethyl diethyl phosphate
13. 1-bromo-2,2,2-trichloro ethyl dimethyl phosphate
14. 1-bromo-2,2,2-trichloro ethyl diethyl phosphate
15. 1,2,2,2-tetrabromo ethyl dimethyl phosphate
16. 1,2,2,2-tetrabromo ethyl diethyl phosphate
17. 1,2-dibromo-2,2-dichloro propyl dimethyl phosphate
18. 1,2-dibromo-2,2-dichloro propyl diethyl phosphate
19. 2,2-dichloro 1-methyl vinyl dimethyl phosphate
20. 2,2-dichloro 1-methyl vinyl diethyl phosphate and the corresponding thiophosphates, for example
21. 2,2-dichloro vinyl dimethyl thiophosphate.

I claim:

1. A pesticidal composition consisting essentially of:

A. 2,2-dichloro vinyl dimethyl phosphate
2,2-dichloro vinyl diethyl phosphate
2,2-dichloro vinyl dipropyl phosphate
2,2-dichloro vinyl dibutyl phosphate
2,2-dibromo vinyl dimethyl phosphate
2,2-dibromo vinyl diethyl phosphate
2,2-dibromo vinyl dipropyl phosphate
2-bromo-2-chloro vinyl dimethyl phosphate
2-bromo-2-chloro vinyl diethyl phosphate
2,2-dichloro vinyl ethyl methyl phosphate
1,2-dibromo-2,2-dichloro ethyl dimethyl phosphate
1,2-dibromo-2,2-dichloro ethyl diethyl phosphate
1-bromo-2,2,2-trichloro ethyl dimethyl phosphate
2-bromo-2,2,2-trichloro ethyl diethyl phosphate
1,2,2,2-tetrabromo ethyl diethyl phosphate
1,2,2,2-tetrabromo ethyl dimethyl phosphate
1,2-dibromo-2,2-dichloro propyl dimethyl phosphate
1,2-dibromo-2,2-dichloro propyl diethyl phosphate
2,2-dichloro-1-methyl vinyl dimethyl phosphate
or
2,2-dichloro-1-methyl vinyl diethyl phosphate
and B. not more than about 0.05 to 10 percent based on the weight of the phosphoric ester of elemental sulfur to effectively stabilize said ester against decomposition by protonization displacement of a lower alkyl group of said phosphoric ester in favor of a hydrogen atom as a result of contact with water molecules, when exposed to the humidity of the atmosphere.

2. A composition according to claim 1 characterised in that the proportion of the stabilising agent is 0.2 to 4 percent of the weight of the phosphoric ester.

3. A composition according to claim 1 characterised in that the molecule of the phosphoric ester contains one or two groups chosen from ethyl and methyl groups.

4. A composition according to claim 1 characterised in that the phosphoric ester contains at least one methyl group.

5. A composition according to claim 1 wherein component (A) is 2,2-dichloro vinyl dimethyl phosphate.

* * * * *